(12) United States Patent
Hsia

(10) Patent No.: US 6,471,222 B1
(45) Date of Patent: Oct. 29, 2002

(54) ADJUSTABLE SEAT BACK ARRANGEMENT FOR STROLLER

(76) Inventor: Ben M. Hsia, 19401 Business Center Dr., Northridge, CA (US) 91324

( * ) Notice: Subject to any disclaimer, the term of this patent is extended or adjusted under 35 U.S.C. 154(b) by 0 days.

(21) Appl. No.: 09/843,625

(22) Filed: Apr. 26, 2001

(51) Int. Cl.⁷ .................................................. B62B 7/00
(52) U.S. Cl. ..................................... 280/47.4; 280/658
(58) Field of Search ................................. 280/642, 644, 280/647, 650, 658, 47.38, 47.4; 24/115 G

(56) References Cited

U.S. PATENT DOCUMENTS

| | | | | |
|---|---|---|---|---|
| 3,746,392 A | * | 7/1973 | German ...................... 297/380 |
| 4,506,417 A | * | 3/1985 | Hara ........................ 24/115 G |
| 5,445,433 A | * | 8/1995 | Avihod ....................... 297/380 |
| 5,490,685 A | * | 2/1996 | Kitayama et al. ........ 280/47.38 |
| 5,590,896 A | * | 1/1997 | Eichhorn ..................... 280/642 |
| 5,711,032 A | * | 1/1998 | Carpenter ...................... 2/158 |
| 5,737,808 A | * | 4/1998 | Ikeda ...................... 24/115 G |
| 5,738,410 A | * | 4/1998 | Stroud et al. .......... 297/354.12 |

* cited by examiner

Primary Examiner—Jack Lavinder
Assistant Examiner—Xuan Lan Nguyen
(74) Attorney, Agent, or Firm—Raymond Y. Chan; David & Raymond Patent Group

(57) ABSTRACT

An adjustable seat back arrangement for stroller includes two elongated elements extended from two construction bars to a rear side of a back support, an inclination locker securely locked up the two elongated elements together for adjusting lengths of the elongated elements between the construction bars and the inclination locker so as to adjust an inclined angle of the back support with respect to a seat support.

8 Claims, 5 Drawing Sheets

ADJUSTABLE SEAT BACK ARRANGEMENT FOR STROLLER

BACKGROUND OF THE PRESENT INVENTION

1. Field of Invention

The present invention relates to strollers, and more particularly to an adjustable seat back arrangement for a stroller which provides a user such as a baby or a young child of the stroller with an adjustable angle of back support.

2. Description of Related Arts

Stroller, which is becomes a necessity to every family having a young child or baby, is consider as a conveniences tool to carry the baby or young child during outdoor activities such as foot traveling and shopping.

A conventional stroller comprises a front frame, a back frame, and a seat frame supported by the front frame and the back frame wherein the seat frame has a seat support portion and a back support portion extended from the seat support portion in an upright manner such that the user which is the baby or a young child is capable of sitting on the seat frame, so as to carry the baby or young child everywhere. However, the baby or young child is forced to sit upright on the stroller. Since the baby or young child is soft and weak, he or she may feel uncomfortable, and serious. the upright type Seat frame may hurt his or her backbone permanently.

As shown in FIG. 1, an improved stroller having an inclined back support A1 enables the user to inclinedly lay his or her back thereon wherein the inclined back support A1 comprises a pair of latches A2, each having two spaced engaging teeth A21 pivotally connected to two sides of the back support portion of the seat frame and a pair of rivets A3 protruded from inner sides of the front frame in such a manner that the engaging teeth A21 are selectively engaged with the rivets A3 respectively for adjusting an inclined angle of the back support portion, between an upright sitting angle and an inclined lying angle, with respect to the seat support portion of the seat frame.

However, such inclined back support A1 of the stroller fails to well support the inclined back of the user. Since the inclined back support A1 supports the back support portion at two sides only, the user has an intention to indent on the seat fabric by his or her own weight downwardly. Thus, the inclined angle of the back support portion is limited by the length of the latches A2 such that the slope of the back support portion may not fittedly support the user's back.

Moreover. the inclined back support A1 will alter the original structural design of the stroller so as to limit the shape of the stroller. Once the parent needs to adjust the inclined angle of the back support portion, he or she must disengage the latches A2 at two sides of the seat frame. In other words, the parent must take away the baby or young child from the stroller in order to operate the inclined back support. However, it is impossible for a single parent to handle the baby and operate the inclined back support A1 at the same time.

Also, the inclined angle of the back support portion is limited to only two predetermined angles, i.e. the upright sitting angle and the inclined lying angle. The user and his or her parents have no personal choose for other more comfortable slanted angle.

SUMMARY OF THE PRESENT INVENTION

A main object of the present invention is to provide an adjustable seat back arrangement specifically incorporated with a stroller, which provides a better back support to a user's back so that the user is capably of lying on the stroller comfortably.

Another object of the present invention is to provide an adjustable seat back arrangement for stroller, wherein the user can select any inclined angle of the back support of the stroller personally. In other words, the inclination is completely adjustable and the slope of the back support can be adjusted to fittingly support the user's back.

Another object of the present invention is to provide an adjustable seat back arrangement for stroller. wherein the back support can be quickly and easily adjusted its inclined angle with respect to the seat support. Another object of the present invention is to provide an adjustable seat back arrangement for stroller, which enables the back support to be inclinedly supported without altering or complicating the original structure of the stroller.

Another object of the present invention is to provide an adjustable seat back arrangement for stroller, which can even reinforce the structure of seat frame and enhance the seat frame's weight supporting ability.

Another object of the present invention is to provide an adjustable seat back arrangement for stroller, wherein no expensive or complicate mechanical structure is required to employ in the present invention in order to achieve the above mentioned objects. Therefore, the present invention successfully provides an economic and efficient solution for selectively adjusting the seat back in any inclined angle and providing reinforced back support configuration to the baby carried in the stroller.

Accordingly, in order to accomplish the above objects, the present invention provides a stroller which comprises a supporting frame including a front frame and a back frame, a seat frame supported by the front frame and the back frame, and a handle frame having two construction bars upwardly extended from the supporting frame.

The seat frame comprises a seat support horizontally supported by the front frame and the back frame and a back support upwardly extended from the seat support.

The stroller further comprises an adjustable seat back arrangement which comprises two elongated elements, each having a predetermined length, extended from two construction bars respectively to a rear side of the back support, an inclination locker securely locked up the two elongated elements together so as to adjust the lengths of the elongated elements, and two side supporting units extended between two sides of the back support and the two construction bars respectively for holding the back support between an upright position and an fully extended position, wherein in the upright position, the hack support is vertically extended from the seat support, and in the fully extended position, the back support is inclinedly extended from the seat support with a maximum inclined angle of the back support with respect to the seat support.

Whereby, by varying the lengths of the two elongated elements by the inclination locker, the back support is capable of adjusting an inclined angle thereof between the upright position and the fully extended position.

DETAILED DESCRIPTION OF THE PREFERRED EMBODIMENT

Figure 1:
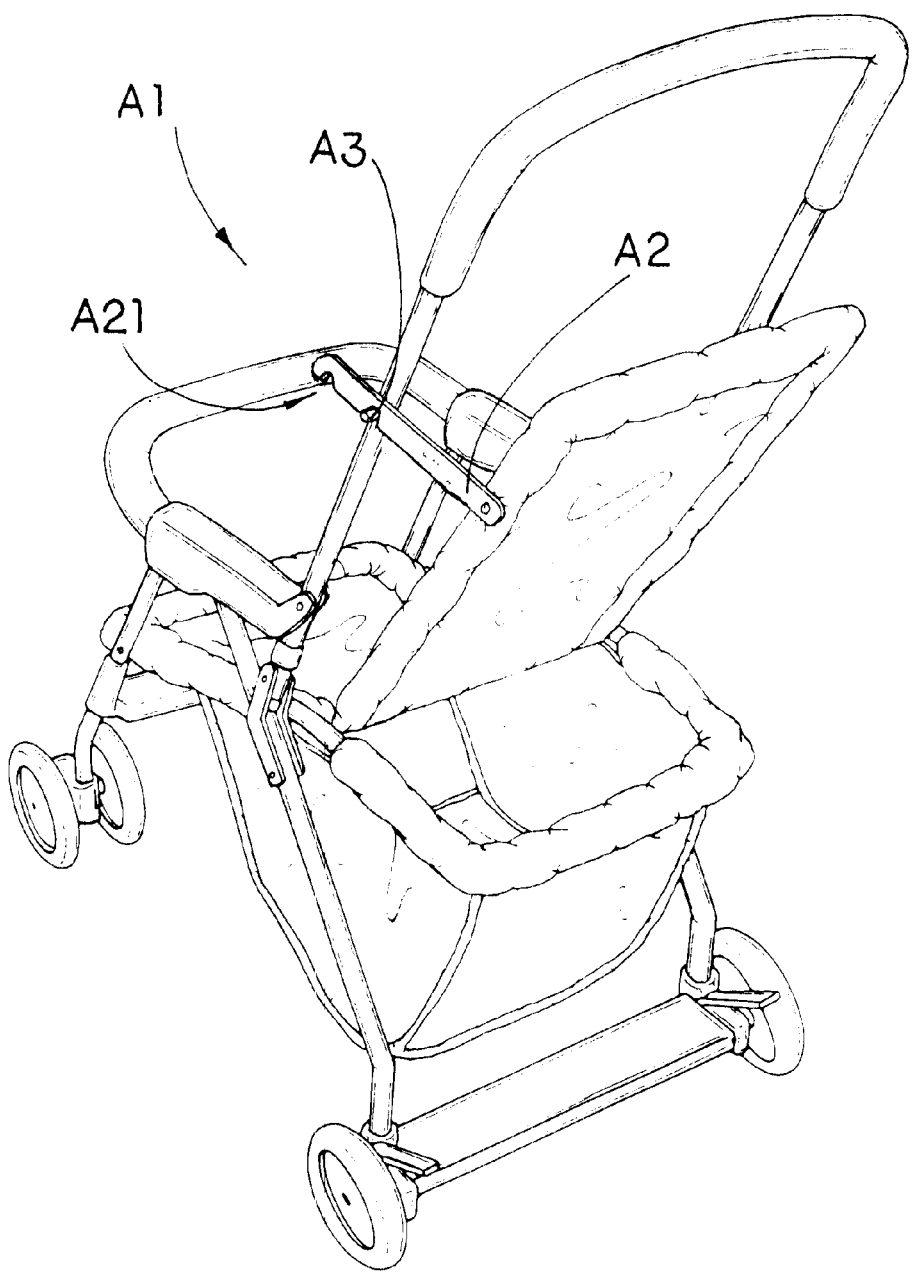
FIG. 1 is a rear perspective view of a conventional inclined back support of a stroller.
Figure 2:
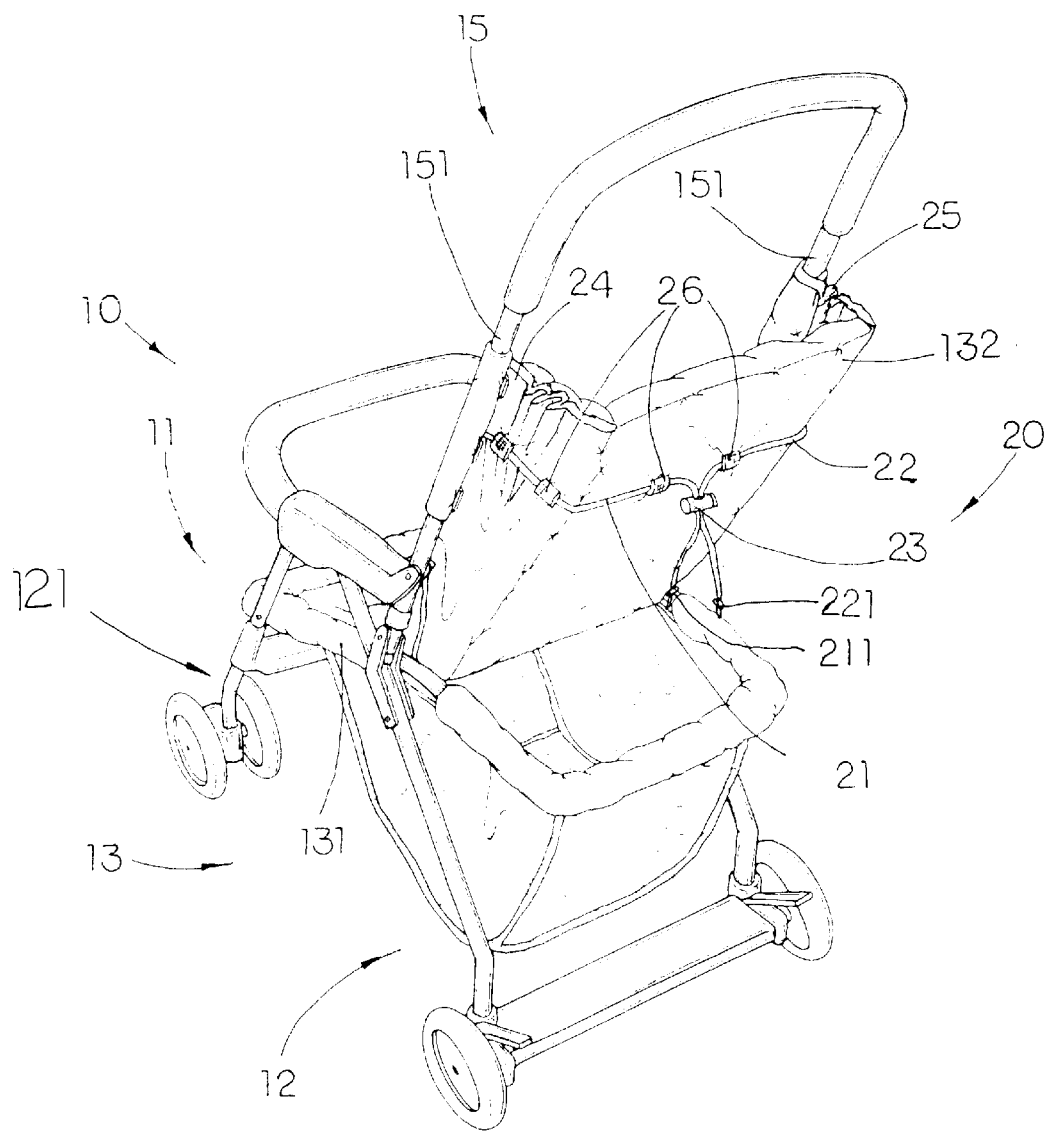
FIG. 2 is a rear perspective view of a stroller incorporated with an adjustable seat back arrangement according to a preferred embodiment of the present invention.

Referring to FIG. 2 of the drawings, a stroller 10 incorporated with an adjustable seat back arrangement 20 according to a preferred embodiment of the present invention is illustrated. The stroller 10, such as a standard stroller, comprises a supporting frame 11 comprising a front frame 121 and a back frame 122, a seat frame 13 supported by the front frame 121 and the back frame 122, and a handle frame 15 having two construction bars 151 upwardly extended from the supporting frame 11.

The seat frame 13 comprises a seat support 131 horizontally supported by the front frame 121 and the back frame 122 and a back support 132 upwardly extended from the seat support 131.

Figure 3A:
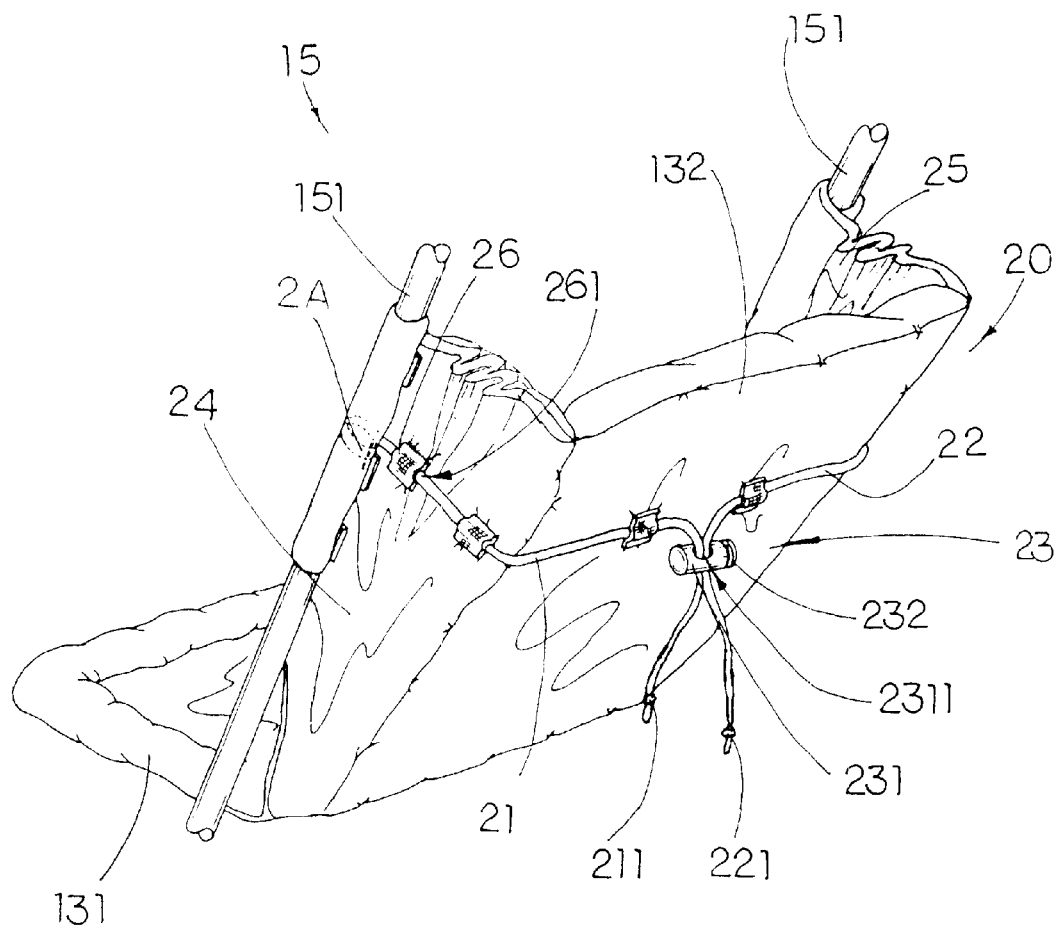
FIG. 3A is a perspective view of the adjustable seat back arrangement incorporated with the stroller according to the above preferred embodiment of the present invention.
Figure 3B:
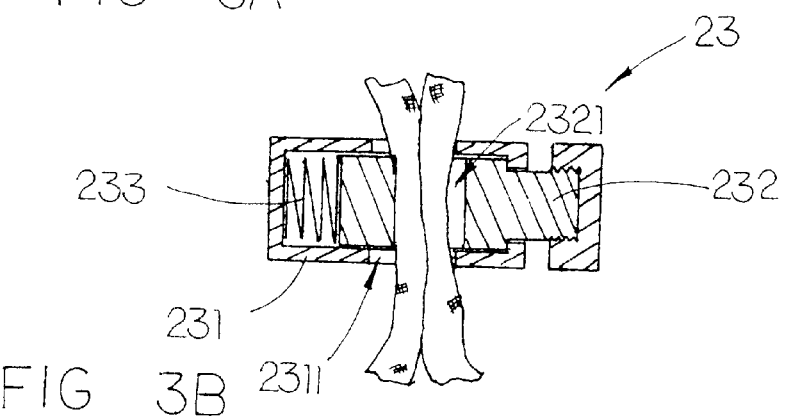
FIG. 3B is a sectional view of an inclination locker of the adjustable seat back arrangement according to the above preferred embodiment of the present invention.

As shown in FIGS. 2 and 3, the adjustable seat back arrangement 20 comprises two elongated elements 21, 22, each having a predetermined length, extended from two construction bars 151 to a rear side of the back support 132, an inclination locker 23 securely locked up the two elongated elements 21, 22 together so as to adjust the lengths of the elongated elements 21, 22, and two side supporting units 24, 25 sidewardly extended from two sides of the back support 132 to the two construction bars 151 respectively for holding the back support 132 between an upright position and an fully extended position. In which, in the upright position, the back support 132 is vertically extended from the seat Support 131, and in the fully extended position, the back support 132 is inclinedly extended from the seat support 131 with a maximum inclined angle of the back support 132 with respect to the seat support 131.

According to the preferred embodiment, the two side supporting units 24, 25 are two side fabric flaps having predetermined widths extended from two side edges of the back support 132, wherein an outer side portion of each of the side supporting units 24, 25 is substantially affixed to the respective construction bar 151 by rivets, so as to limit the maximum inclined angle of the back support 132 with respect to the seat support 131 by the widths of the side supporting units 24, 25.

The two elongated elements 21, 22, which are embodied as two durable strings in the present preferred embodiment, each has one connecting end 2A connected to the outer side of the respective side supporting unit 24, 25 or the respective construction bar 151 and a free end arranged to adjustably engage with the inclination locker 23 behind the rear side of the seat support 132.

According to the preferred embodiment, the connecting ends 2A of the elongated elements 21, 22 are stitched on the side supporting units 24, 25 which are firmly fastened to the construction bars 151 respectively by means of rivets so as to prevent an unwanted movement of the elongated elements 21, 22 along the construction bars 151.

The inclination locker 23 comprises a locker body 231 which is a hollow body having an opened end and a locker hole 2311 radically passing through a central portion thereof an operation body 232 having an inner end slidably inserted into the locker body 231 through the opened end, and a spring 233 is disposed between another closed end of the locker body 231 and the inner end of the operation body 232, wherein the operation body 232 further has a locking hole 2321 radically passing through in such a manner that the locking hole 2321 and the inclination locker hole 2311 are able to be arranged coaxially overlapped with each other when pushing an outer end of the operation body 232 towards the closed end of the locker body 231 so as to enable two free end portions of the two elongated elements 21, 22 slidably passing through both the inclination locker hole 2311 and the locking hole 2321. However, the spring 233 normally pushes the operation body 232 towards its opened end and reduces the gap formed between the locking hole 2321 and the inclination locker hole 2311, so that the locker body 231 and the operation body 232 compress the two elongated elements 21, 22 passing therethrough so as to securely and firmly lock up the position of the inclination locker 23 with respect to the two elongated elements 21, 22.

In other words, by locking the inclination locker 23 at different positions of the two elongated elements 21, 22 can substantially adjust a holding length of each of the elongated elements 21, 22 extended between the inclination locker 23 and the respective construction bar 151. Accordingly, the inclined angle of the back support 132 is limited by the holding length of the two elongated elements 21, 22, i.e. the length of the portion of the elongated element 21, 22 extending between the inclination locker 23 and the respective construction bar 151. On the other hand, the inclination locker 23 and the two elongated elements 21, 22 also support the back support 132 in such an inclined position.

The width of the two side supporting units 24, 25 determines the maximum inclined angle of the back support 132, i.e. the width of two side supporting units 24, 25 limits the inclined angle of the back support 132 such that the back support 132 can only reach its maximum inclined angle even though the elongated elements 21, 22 are further lengthened their lengths.

A total length of the two elongated elements 21, 22 must be longer than a total width of the two side supporting units 24, 25 and the back support 132 such that by varying the location of the inclination locker 23 along the elongated elements 21, 22, the length of the elongated elements 21, 22 between the construction bar 151 and the inclination locker 23, an adequate inclined angle of the back support 132 can be obtained.

Therefore, by adjusting the lock-up position of the inclination locker 23, the user can adjust the length of the portion of each of the elongated elements 21, 22 extending between the inclination locker 23 and the respective construction bar 151, so as to adjust the inclined angle of the back support 132. The shorter the length of the portions of the elongated elements 21, 22 extending between the inclination locker 23 and the construction bars 151, the back support 132 will be set at a more upright position. The longer the length of the portions of the elongated elements 21, 22 extending between the inclination locker 23 and the construction bars 151, the back support 132 will be set at a more inclined position. It is worth to mention that, since the user can lock the inclination locker 23.at ally position along the elongated elements 21, 22, the user can adjust the back support 132, at any desired inclined angle.

In other words, the inclined angle of the back support 132 is reduced when shorten the length of the elongated elements 21, 22 between the construction bar 151 and the inclination locker 23, i.e. the back support 132 tends to fold into the upright position. The inclined angle of the back support 132 is increased when lengthen the length of the elongated elements 21, 22 between the construction bar 151 and the inclination locker 23, i.e. the back support 132 tends to fold into the fully extended position, as shown in FIG. 4.

Besides, each of the free ends of the elongated elements 21, 22 is firmly tied to form a knot 211, 221 for blocking the elongated elements 21, 22 from sliding out of the inclination locker hole 2311, so as to prevent the inclination locker 23 from being disengaged from the elongated elements 21, 22 accidentally during adjusting the position of the inclination locker 23.

In order to more effectively guide the adjustment of the two elongated elements 21, 22, the adjustable seat back arrangement 20 further comprises at least two elongated element guiders 26 provided on the two side supporting units 24, 25, wherein the two elongated elements 21, 22 extend to pass through the two elongated element guiders 26 respectively so as to support the two elongated elements 21, 22 and guide the two elongated elements 21, 22 to extend to the rear side of the back support 132 to connect with the inclination locker 23.

Figure 4:
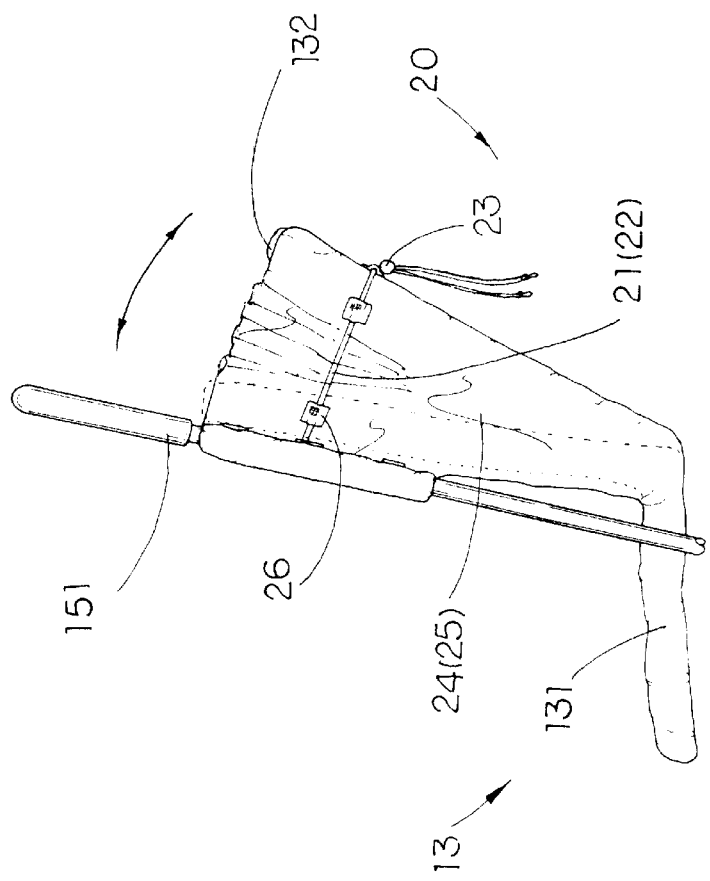
FIG. 4 is a side view of the adjustable seat back arrangement according to the above is preferred embodiment of the present invention.

According to the preferred embodiment as shown in FIGS. 2 to 4, there are a plurality of elongated element guiders 26 spacedly provided on the two side supporting units 24, 25 and the rear side of the back support 132, wherein each of the elongated element guiders 26 has a guiding slot 261 provided for the respective elongated element 21, 22 slidably passing through, so as to guide the elongated elements 21, 22 extended from the construction bars 151 to the inclination locker 23 respectively. As shown in FIGS. 2 and 3A, there are two elongated element guiders 26 spacedly affixed to each of the side supporting units 24, 25 and anthers two elongated element guiders 26 spacedly affixed to two vertical halves of the rear side of the back support 132, wherein all the elongated element guiders 26 are preferably aligned at the same height. Each of the elongated element guiders 26 comprises a section of fabric tape having two sides sewed to the side supporting units 24, 25 or the back support 132 so as to define the guiding slot 261 between the two sewed sides. so that each of the two elongated elements 21, 22 is extended to firstly pass through the two elongated element guiders 26 affixed on the respective side supporting units 24, 25 and secondly pass through the elongated element guiders 26 affixed on the adjacent half of the back support 132. Therefore, the two elongated elements 21, 22 are evenly supported by the elongated element guiders 26 to extend to the central portion of the rear side of the back support 132, so that the user can easily operate the inclination locker 23 to operate and control the length of the elongated elements 21, 22 and thus the inclined angle of the back support 132.

Moreover, when a baby or young child lies on the stroller 10 which incorporates with the adjustable back seat arrangement 20, the child's weight applied to the seat frame 13 will substantially press on the back support 132. Since the elongated elements 21, 22 extend to support the back support 132 at the rear side thereof, the elongated elements 21, 22 will also support the user's weight so as to reinforce the shape of the back support 132 and evenly distribute the user's weight on the back support 132. So, the user does not have an intention to indent on the back support 132 by his or her own weight downwardly.

Figure 5:
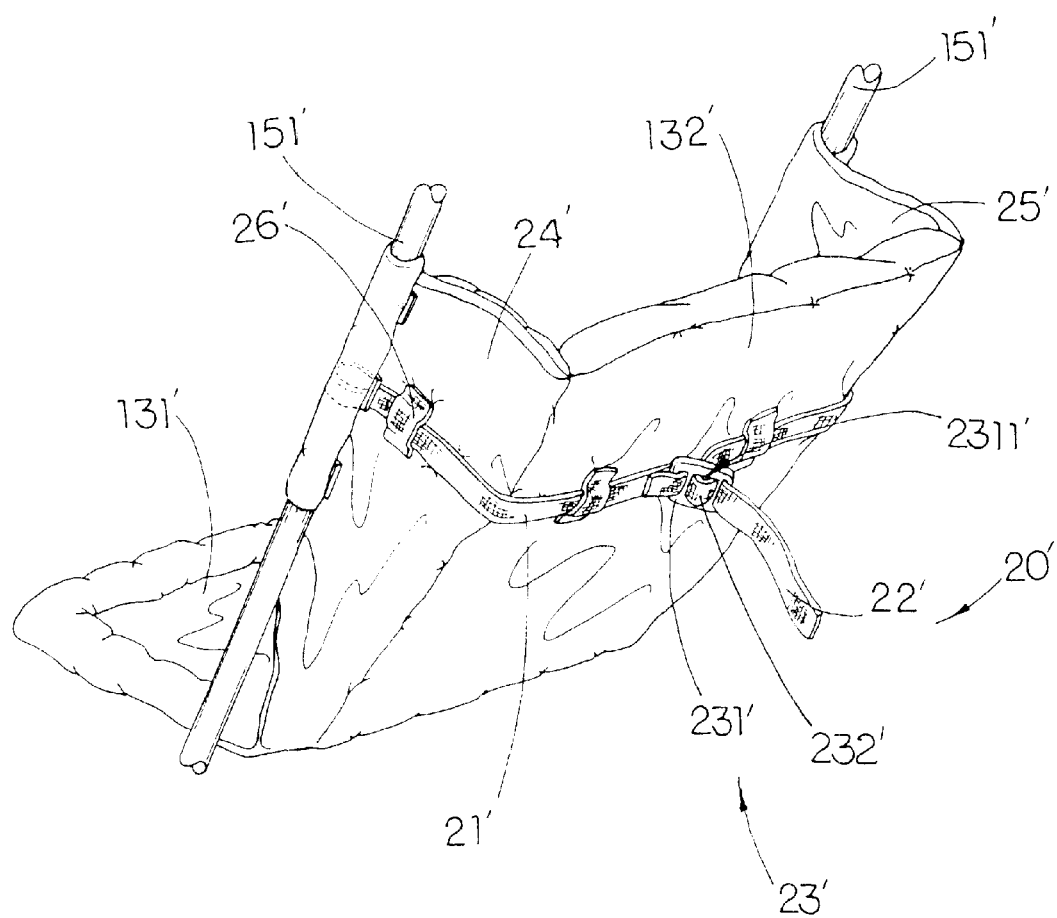
FIG. 5 is a perspective view of an alternative mode of the adjustable seat back arrangement according to the above preferred embodiment of the present invention.

Referring to FIG. 5 of the drawings, an alternative mode of the adjustable inclined back seat arrangement 20'for the above preferred embodiment is illustrated. wherein the two durable strings of the elongated elements 21, 22 are substituted by two durable belts 21', 22'.

Each of the two belts 21', 22' has a connecting end attached to the respective construction bar 151' and a free end arranged to engage with the inclination locker 23' at the real side of the seat support 132'. The connecting ends of the elongated elements 21'. 22' are stitched on the side supporting units 24', 25' which are firmly fastened to the construction bars 151' respectively by means of rivets so as to prevent an unwanted movement of the elongated elements 21', 22' along the construction bars 151'.

The inclination locker 23' comprises a locker body 231' which has two locking slots 2311' and is connected with a free end of one of the elongated element 21' while a free end of another elongated element 22' is prolonged to form a connection end portion functioning as an operation body 232' of the inclination locker 23', wherein the connection end portion of the elongated element 22', i.e. the operation body 232', is entangled through the two locking slots 2311' so as to adjustably lock up the respective belt 22' with a predetermined length between the construction bar 151'and the inclination locker 23'.

In view of the above preferred embodiment and its alternative mode, it should be appreciated that certain obvious modifications, variations, and substitutions may be made without departing from the spirit and scope of the present invention, such as using buckle plugs as the inclination locker.

What is claimed is:

1. A stroller, comprising:

a supporting frame, a seat frame supported by said supporting frame, and a handle frame having two construction bars upwardly extended from said supporting frame wherein said seat frame comprises a seat support horizontally supported by said supporting frame and a back support upwardly extended from said seat support; and an adjustable seat back arrangement, which comprises:

two elongated elements, each having a predetermined length, extended from said two construction bars respectively to a rear side of said back support, wherein each of said elongated elements is a string having one end extended from said respective construction bar;

an inclination locker comprising a locker body which is a hollow body having an opened end and a closed end and an operation which has an inner end slidably inserted into said locker body, and a spring disposed between said closed end of said locker body and said inner end of said operation body, wherein said locker body has a locker hole radically passes through a central portion of said locker body and two free end portions of said two elongated elements slidably penetrate through said locker hole, wherein said operation body further has a locking hole radically passing through in such a manner that said locking hole and said locker hole are able to be arranged coaxially overlapped with each other when pushing an outer end of said operation body towards said closed end of said locker body so as to enable two free end portions of said two elongated elements slidably passing through both said locker hole and said locking hole, wherein said spring normally pushes said operation body towards said opened end thereof and reduces a gap formed between said locking hole and said locker hole, wherein said locker body and said operation body compress said two elongated elements passing therethrough so as to securely and firmly lock up said two elongated elements together in any predetermined position along a length of said each of said elongated elements to adjust said lengths of said two elongated elements between said construction bars and said inclination locker respectively so as to adjust an inclined angle of said back support with respect to said seat support; and at least two elongated element guiders spacedly provided on two halves of said rear side of said back support respectively for supporting and guiding said two elongated elements respectively, wherein each of said elongated element guiders has a guiding slot and said two elongated elements are extended to slidably pass through said two guiding slots respectively so as to guide said two elongated elements extending to connect with said inclination locker.

2. The stroller, as recited in claim 1, wherein each of said free end of said elongated elements is firmly tied a knot for blocking said elongated elements from sliding out of said locker hole so as to prevent said inclination locker from being disengaged from said elongated elements accidentally.

3. The stroller, as recited in claim 1, wherein said adjustable seat back arrangement further comprises two side supporting units sidewardly extended from two sides of said back support to said two construction bars respectively for folding said back support between an upright position and an fully extended position, wherein in said upright position, said back support is vertically extended from said seat support and in said fully extended position, said back support is inclinedly extended from said seat support with a maximum inclined angle of said back support with respect to said seat support, wherein a total length of said two elongated elements is longer than a total width of said side supporting units and said back support, wherein said adjustable seat back arrangement further comprises two additional elongated element guiders each having a guiding slot and said two elongated elements are extended to slidably pass through said two guiding slots of said two additional elongated element guiders respectively, therefore said two elongated elements are evenly supported by said additional elongated element guiders and said elongated element guiders to extend to a central portion of said rear side of said back support.

4. The stroller, as recited in claim 2, wherein said adjustable seat back arrangement further comprises two side supporting units sidewardly extended from two sides of said back support to said two construction bars respectively for folding said back support between an upright position and an fully extended position, wherein in said upright position, said back support is vertically extended from said seat support and in said fully extended position, said back support is inclinedly extended from said seat support with a maximum inclined angle of said back support with respect to said seat support, wherein a total length of said two elongated elements is longer than a total width of said side supporting units and said back support, wherein said adjustable seat back arrangement further comprises two additional elongated element guiders each having a guiding slot and said two elongated elements are extended to slidably pass through said two guiding slots of said two additional elongated element guiders respectively, therefore said two elongated elements are evenly supported by said additional elongated element guiders and said elongated element guiders to extend to a central portion of said rear side of said back support.

5. The stroller, as recited in claim 1, wherein each of said elongated element guiders comprises a section of fabric tape having two sides sewed to said back support so as to define said guiding slot between said two sides.

6. The stroller, as recited in claim 2, wherein each of said elongated element guiders comprises a section of fabric tape having two sides sewed to said back support so as to define said guiding slot between said two sides.

7. The stroller, as recited in claim 3, wherein each of said elongated element guiders comprises a section of fabric tape having two sides sewed to said back support to define said guiding slot between said two sides and each of said two additional elongated element guiders also comprises a section of fabric tape having two sides sewed to said respective side supporting unit to define said guiding slot between said two sides.

8. The stroller, as recited in claim 4, herein each of said elongated element guiders comprises a section of fabric tape having two sides sewed to said back support to define said guiding slot between said two sides and each of said two additional elongated element guiders also comprises a section of fabric tape having two sides sewed to said respective side supporting unit to define said guiding slot between said two sides.

* * * * *